United States Patent
Graves et al.

(10) Patent No.: US 9,180,557 B1
(45) Date of Patent: Nov. 10, 2015

(54) TWO-PIECE REPLACEMENT NOZZLE

(71) Applicant: AREVA Inc., Lynchburg, VA (US)

(72) Inventors: Charles A. Graves, Forest, VA (US); David E. Waskey, Bedford, VA (US)

(73) Assignee: AREVA Inc., Lynchburg, VA (US)

( * ) Notice: Subject to any disclaimer, the term of this patent is extended or adjusted under 35 U.S.C. 154(b) by 302 days.

(21) Appl. No.: 14/257,134

(22) Filed: Apr. 21, 2014

(51) Int. Cl.
*B23K 31/02* (2006.01)
*B23P 6/00* (2006.01)

(52) U.S. Cl.
CPC . *B23P 6/00* (2013.01); *B23K 31/02* (2013.01); *B23K 2201/12* (2013.01)

(58) Field of Classification Search
None
See application file for complete search history.

(56) References Cited

U.S. PATENT DOCUMENTS

| | | | | |
|---|---|---|---|---|
| 4,079,967 A * | 3/1978 | Schoessow | | 285/47 |
| 4,255,840 A * | 3/1981 | Loch et al. | | 29/890.031 |
| 4,440,339 A | 4/1984 | Tamai et al. | | |
| 4,480,841 A * | 11/1984 | Schukei et al. | | 277/526 |
| 4,611,813 A * | 9/1986 | Guerrero | | 277/314 |
| 4,670,213 A * | 6/1987 | Wilson et al. | | 376/446 |
| 4,686,077 A * | 8/1987 | Straub | | 376/230 |
| 4,723,795 A * | 2/1988 | Shenoy | | 285/123.12 |
| 4,738,820 A * | 4/1988 | Wilson et al. | | 376/446 |
| 4,826,217 A * | 5/1989 | Guerrero | | 285/141.1 |
| 5,030,413 A * | 7/1991 | Knierriem et al. | | 376/364 |
| 5,091,140 A | 2/1992 | Dixon et al. | | |
| 5,094,801 A | 3/1992 | Dixon et al. | | |
| 5,135,705 A * | 8/1992 | Gooch et al. | | 376/203 |
| 5,253,277 A * | 10/1993 | Allen | | 376/265 |
| 5,271,048 A * | 12/1993 | Behnke et al. | | 376/260 |
| 5,274,683 A | 12/1993 | Broda et al. | | |
| 5,297,176 A * | 3/1994 | Altman et al. | | 376/364 |
| 5,367,768 A * | 11/1994 | Weems | | 29/890.031 |
| 5,428,198 A * | 6/1995 | Peigney et al. | | 219/61 |
| 5,483,560 A * | 1/1996 | Potz et al. | | 376/250 |
| 5,515,589 A * | 5/1996 | Kazirskis et al. | | 29/402.18 |
| 5,675,618 A * | 10/1997 | Amburn et al. | | 376/203 |
| 5,918,911 A | 7/1999 | Sims | | |
| 6,345,084 B1 * | 2/2002 | Jensen | | 376/352 |
| 6,888,908 B1 | 5/2005 | Klarner et al. | | |
| 7,206,372 B2 | 4/2007 | Willis et al. | | |
| 2005/0199591 A1 | 9/2005 | Coe et al. | | |
| 2005/0220250 A1 | 10/2005 | Payne et al. | | |
| 2006/0078080 A1* | 4/2006 | Payne et al. | | 376/204 |
| 2007/0031591 A1* | 2/2007 | Junker et al. | | 427/140 |
| 2007/0253519 A1* | 11/2007 | Meier et al. | | 376/260 |

(Continued)

FOREIGN PATENT DOCUMENTS

| | | | | |
|---|---|---|---|---|
| JP | 06230167 A * | 8/1994 | | G21C 13/00 |
| JP | 2007232457 A * | 9/2007 | | |

*Primary Examiner* — Kiley Stoner
(74) *Attorney, Agent, or Firm* — Sean P. O'Hanlon, Esq., PLLC

(57) ABSTRACT

This invention provides an improved replacement nozzle configuration. The nozzle is provided in two pieces. A first nozzle piece is a relatively thin-walled cylinder that is inserted into the counterbored opening of a pressure vessel after the protruding portion of the original nozzle has been removed. A weld pad is attached to the pressure vessel, to which the first replacement nozzle piece is welded. Due to the reduced dimensions of the thin-walled first nozzle portion, a much smaller weld pad and pad-to-nozzle weld can be used. A second nozzle piece is positioned within the first nozzle piece and welded thereto. The existing instrumentation piping is connected to the free end of the second nozzle piece. This two-piece replacement nozzle can be implemented in approximately half the time required for the one-piece design.

9 Claims, 4 Drawing Sheets

(56) References Cited

U.S. PATENT DOCUMENTS

| | | |
|---|---|---|
| 2008/0008287 A1* | 1/2008 | Riccardella et al. ........... 376/260 |
| 2008/0110229 A1* | 5/2008 | Badlani et al. ................ 72/367.1 |
| 2008/0240331 A1* | 10/2008 | Park et al. ...................... 376/249 |
| 2011/0194663 A1 | 8/2011 | Hori et al. |
| 2012/0175352 A1* | 7/2012 | Kamo et al. ................ 219/121.6 |
| 2012/0285398 A1* | 11/2012 | Fujita et al. .................... 122/379 |
| 2012/0288049 A1* | 11/2012 | Renshaw et al. .............. 376/247 |
| 2013/0068318 A1* | 3/2013 | Kliskey et al. ............ 137/315.01 |
| 2013/0068988 A1* | 3/2013 | Kliskey et al. ................. 251/366 |
| 2013/0121452 A1* | 5/2013 | Bodner et al. ................. 376/267 |
| 2013/0272466 A1* | 10/2013 | Edwards et al. .............. 376/230 |
| 2014/0068908 A1* | 3/2014 | Hickey ...................... 29/402.19 |
| 2014/0102210 A1* | 4/2014 | Kang et al. ...................... 73/756 |
| 2014/0123456 A1* | 5/2014 | Newton et al. ............. 29/402.08 |
| 2014/0217675 A1* | 8/2014 | Miller et al. ................... 277/314 |
| 2015/0013414 A1* | 1/2015 | Sakashita .......................... 72/56 |

* cited by examiner

TWO-PIECE REPLACEMENT NOZZLE

BACKGROUND OF THE INVENTION

1. Field of the Invention

The present invention relates to a replacement nozzle for a pressurized vessel, and, more particularly, the present invention relates to a two-piece replacement nozzle and welding techniques associated therewith.

2. Description of the Related Art

While the present invention may be used in a variety of industries, the environment of a pressurized water reactor (PWR) nuclear power plant will be discussed herein for illustrative purposes. A typical PWR plant includes (in part) a reactor vessel, steam generator, pressurizer, and a reactor coolant piping system, all of which operate under high pressure. Nozzles are attached to the vessels and/or piping for a number of purposes, such as for connecting piping and instrumentation, providing vents, and securing control element drive mechanisms and heater elements. A typical pressure vessel in the form of a pressurizer 10 is shown in FIG. 1. The pressurizer 10 includes nozzles 12 for vents, nozzles 14 for sampling liquid level or pressure sensing, a nozzle 16 for temperature measuring, and a number of bottom nozzles 18, 20 for heating elements. All of these nozzles are welded to the pressure vessel at the time of original manufacture.

As shown in FIG. 2, cladding 22, typically made of stainless steel, is welded to the interior of the pressurizer 10, which is made of carbon steel. The nozzle 16 shown in cross section in FIG. 2 is exemplary of the mentioned welded nozzles, which all pass through a hole or bore 24 in the pressure vessel 10 and which are structurally welded at the interior end 26 to the vessel 10 with a J-groove weld 28 along the interior opening to the bore 24. The diameter of nozzle 16 is slightly less than the diameter of bore 24, so that there is a small annular space 30 between the nozzle exterior and the wall of bore 24. In some applications the nozzles are fit tight to the bore, and in a control rod drive mechanism, they are installed with a shrink fit process. The nozzles may also be roll-expanded in the bore 24. The J-groove weld 28 also functions as a seal weld to seal the annular space 30. A reactor vessel similarly has nozzles represented by nozzle 16 in FIG. 2 welded thereto. Corresponding reactor vessel nozzles are located in the lower spherical head and allow instrumentation to be inserted into the reactor core. The piping of the reactor coolant system (not shown) also includes similar nozzles welded thereto. Further details of pressurizer vessels, reactor vessels, and coolant system piping, in particular, and nuclear power facilities, in general, are known to those of skill in the art.

Nozzle failures and leakage in nuclear power facilities is mainly due to SCC (stress corrosion cracking), which occurs on components having a susceptible material, high tensile stresses, high temperature, and which are in a corrosive environment, conditions which primarily exist on nozzle penetration in the pressurizer vessel, reactor coolant piping, and the reactor pressure vessel. Such failures are manifested by cracking. Such cracking occurs at the grain boundaries on the inside diameter of the nozzle material at or near the heat-affected zone of the weld and propagates radially outward through the thickness of the nozzle, which can eventually lead to small leakage of the reactor coolant supply. Failures have also occurred on stainless steel pressurizer nozzles.

As indicated, nozzles of these types have failed over time and have had to be replaced or repaired, as inspections on the nozzles and welds have revealed small indications or, in some cases, very minor leakage of primary coolant. One known repair method entails machining off the portion of the original nozzle protruding from the pressure vessel, attaching a weld pad to the vessel surrounding the nozzle location, and welding a one-piece replacement nozzle to the weld pad, the replacement nozzle having the same or similar dimensions as the original nozzle. The weld pad and pad-to-nozzle weld required by applicable code with this method are relatively large due to the size of the replacement nozzle. The problems inherent with the large structural weld joint geometries include a long schedule duration for welding during implementation, a potential for high personnel radiation exposure during implementation, and an increased risk of potential welding issues during implementation.

SUMMARY OF THE INVENTION

This invention provides an improved replacement nozzle. The nozzle is provided in two pieces. A first nozzle piece is a thin-walled cylinder that is inserted into the counterbored opening of the pressure vessel after the protruding portion of the original nozzle has been removed. A weld pad is attached to the pressure vessel, to which the first replacement nozzle piece is welded. However, due to the reduced dimensions of the thin-walled first nozzle portion, a much smaller weld pad and pad-to-nozzle weld can be used. A second nozzle piece is positioned within the first nozzle piece and welded thereto. The existing instrumentation piping connected to the free end of the second nozzle piece in known manner. This two-piece replacement nozzle can be implemented in approximately half the time required for the one-piece design, reducing outage critical path schedule and personnel radiation dose.

A method of replacing a nozzle in a pressure vessel includes removing the portion of the nozzle extending outside the pressure vessel, preferably with a counterbore extending into the pressure vessel wall. A relatively small weld pad is provided on the outside of the pressure vessel, the weld pad having a machined hole aligned with and similarly dimensioned to the counterbore. A thin-walled first replacement nozzle piece is inserted into the weld pad hole and counterbore such that it is adjacent to the end of the remaining section of the original nozzle. A small gap may be left between the first replacement nozzle piece and the remaining nozzle section. The first replacement nozzle portion is then welded to the weld pad. The sizes of the weld pad and the pad-to-nozzle weld are significantly smaller than would normally be required due to the thin walls of the first replacement nozzle piece.

A second thin-walled replacement nozzle piece is inserted within the first nozzle piece such that its end is aligned with the end of the first nozzle piece and adjacent the end of the remaining portion of the original nozzle. The replacement nozzle pieces are then welded together, and the plant instrumentation is reinstalled through the replacement nozzle. The combined pieces of the replacement nozzle have substantially the same outside diameter, inside diameter, and wall thickness as the original nozzle.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

This invention is drawn to a replacement nozzle for a nuclear pressure vessel, such as a bottom mounted instrument nozzle of a reactor. Such nozzles allow instrumentation to pass through the pressure vessel to take measurements within the reactor. These nozzles are affixed to the pressure vessel by J-groove welds that attach the nozzles to the inner surface of the pressure vessel.

Figure 1:
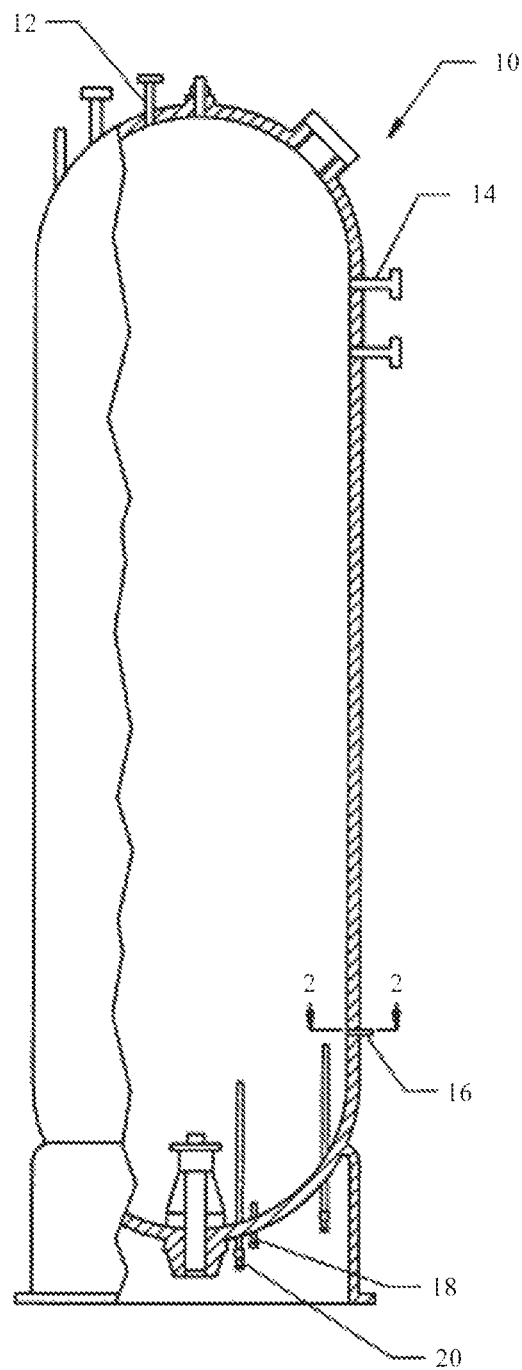
FIG. 1 is a cross sectional view of a known pressure vessel. A pressurizer is shown for illustrative purposes, as the invention is applicable to small diameter nozzles located in other primary system components and piping as well.
Figure 2:
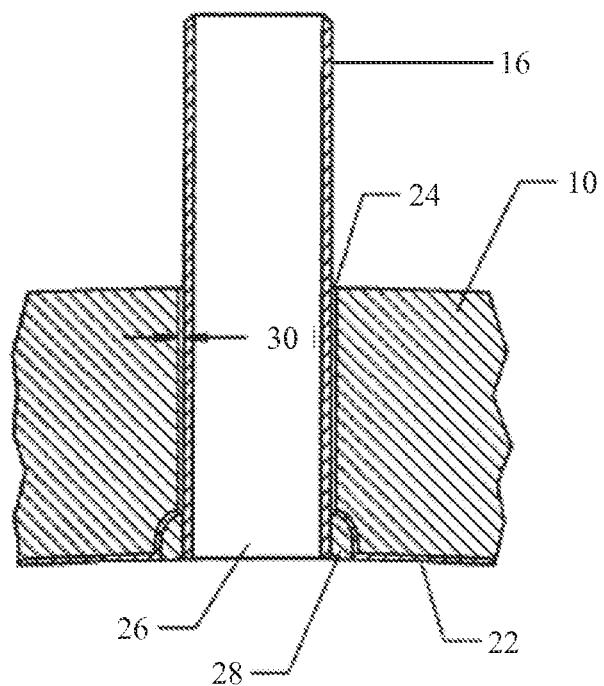
FIG. 2 is a cross sectional view of a nozzle taken along section 2-2 of FIG. 1.
Figure 3:
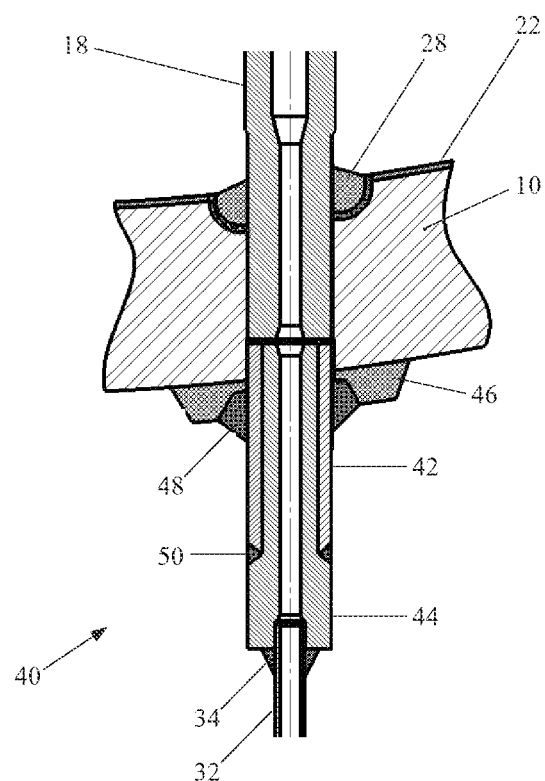
FIG. 3 shows a cross sectional view of a two-piece replacement nozzle of the present invention installed in a pressure vessel.

FIG. 3 shows a cross sectional view of an original nozzle 18 and a replacement nozzle 40 of the present invention installed in a pressure vessel. A nozzle for bottom mounted instrumentation 18 is shown, but it will be recognized that the present invention can be used with any type of pressure vessel penetration. The replacement nozzle 40 is a two-piece nozzle, including a first, outer nozzle section 42 and a second, inner nozzle section 44. The first nozzle piece 42 is a thin-walled cylinder that is inserted into the counterbored opening 24 of the pressure vessel 10 after the protruding portion of original nozzle 16 has been removed. A weld pad 46 is attached to the pressure vessel, to which the first replacement nozzle piece 42 is welded via weld 48. However, due to the reduced dimensions of the thin-walled first nozzle portion 42, a much smaller weld pad 46 and pad-to-nozzle weld 48 can be used. A second nozzle piece 44 is positioned within the first nozzle piece 42 and welded thereto via weld 50. The existing instrumentation piping 32 is connected to the free end of the second nozzle piece 44 in known manner, such as via weld 34. This two-piece replacement nozzle 40 can be implemented in approximately half the time required for the one-piece design, reducing outage critical path schedule and personnel radiation dose.

Figure 4:
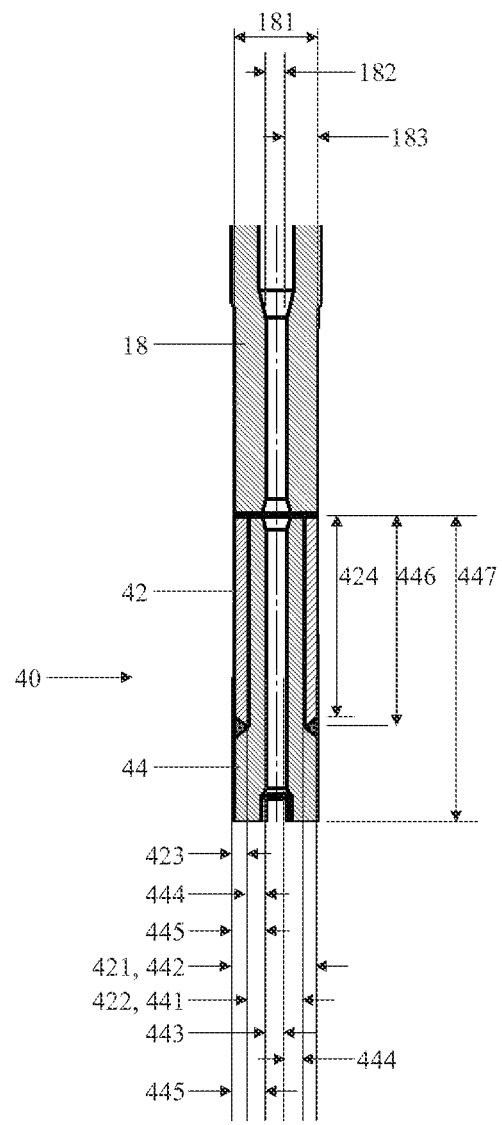
FIG. 4 shows a cross sectional view of the two-piece replacement nozzle of FIG. 3 and illustrates its resemblance to the original nozzle.

FIG. 4 shows a cross sectional view of the original 18 and replacement 40 nozzles. The original nozzle 18 has an outside diameter 181 and an inside diameter 182 that define a wall thickness 183. As discussed above, the outside diameter 181 corresponds very closely to the diameter of the opening 24 through the pressure vessel 10. The inside diameter 182 allows for the introduction of instrumentation into the pressure vessel.

The outer replacement nozzle portion 42 has an outside diameter 421 and an inside diameter 422 that define a wall thickness 423. The outside diameter 421 is substantially the same as or slightly larger than the outside diameter 181 of the original nozzle 18.

The inner replacement nozzle portion 44 has a stepped profile with a first section having an axial length 446 that is less than the overall axial length 447 of the inner nozzle portion 44. The first section of the inner nozzle portion 44 has an outside diameter 441 and an inside diameter 443 that define a first wall thickness 444. The outside diameter 441 of the inner nozzle section 44 corresponds closely to the inside diameter 422 of the outer nozzle section 42 so that the inner section 44 can be inserted within the outer section 42. The axial length 446 of the first 15 inner nozzle section corresponds with the axial length of the outer nozzle section 42 so that when the inner nozzle section 44 is positioned within the outer nozzle section 42, the two sections can be joined together, such as by a butt weld 50. Thus, first outside diameter axial length 446 is a bit longer than the axial length 424 of the outer nozzle section 42.

The second section of the inner replacement nozzle portion 42 has the same inside diameter 443 as the first section, but has a second outside diameter 442 that is larger than the first outside diameter 441. The second outside diameter 442 is substantially the same as the outside diameter 421 of the outer nozzle section 42. Thus, when joined together, the replacement nozzle sections 42, 44 form a unit having an inside diameter 443 and outside diameter 421, 442 that define a wall thickness 445. These dimensions of the replacement nozzle 40 (that is, the combined unit of the outer replacement nozzle section 42 and the inner replacement nozzle section 44) are substantially the same as those of the original nozzle 18. The wall thickness 445 of the replacement nozzle 40 is substantially the same as the wall thickness 183 of the original nozzle 18. Preferably, the wall thickness 423 of the outer replacement nozzle section 42 and the first wall thickness 444 of the inner replacement nozzle section 44 are substantially the same.

The installation of the replacement nozzle 40 begins by removing the portion of the original nozzle 18 extending outside of the pressure vessel 10. That is, the portion of the original nozzle 18 extending beyond the exterior surface of the pressure vessel 10 is removed in known manner, such as using a split lathe on the exterior of the interior of the original nozzle 18. Preferably, a counterbore is formed by removing a portion of the original nozzle 18 inside the outer surface of the pressure vessel 10, creating an opening into which the replacement nozzle 40 can be positioned. (See FIG. 3.)

After the exterior portion of the original nozzle 18 has been removed, a weld pad 46 is welded to the exterior surface of the pressure vessel 10. The weld pad 46 has a torus-like shape, and is centered about the pressure vessel bore 24. A hole is created in the weld pad, the weld pad hole having substantially the same diameter as the bore 24. This weld pad hole can be formed during the welding of the pad 46 itself, or can be created in a second machining step after the weld pad 46 has been created. The outer replacement nozzle portion 42 is then positioned within the weld pad hole and counterbore such that its interior end is adjacent to the end of the original nozzle 18 created during the removal step discussed above. Once in place, the outer nozzle portion 42 is welded to the weld pad 46 such as via a J-groove weld 48.

Next, the inner nozzle portion 44 is inserted into the outer nozzle portion 42 and positioned such that its interior end is substantially coplanar with the inner nozzle interior end and is adjacent to the end of the original nozzle 18. The inner nozzle portion 44 is then connected to the outer nozzle portion 42 such as via a butt weld 50. With the replacement nozzle 40 in place, the plant instrumentation piping 32 can then be connected to the exterior end of the replacement nozzle 40.

It should be noted that because the wall thickness 423 of the outer nozzle portion 42 is substantially thinner than the wall thickness 183 of the original nozzle 18, both the weld pad 46 and the J-groove weld 48 are much smaller than would be required for a one-piece replacement nozzle. Where the process of installing a one-piece replacement nozzle would be a two-week project, installation of the two-piece replacement nozzle 40 of the present invention is a one-week process. This results in a significant reduction of the radiation dose incurred by personnel installing the replacement nozzle and of the outage critical path schedule by approximately 5-7 days, which may reduce the overall duration that the reactor is off-line.

The placement of the replacement nozzle 40 on the exterior surface of the pressure vessel 10 provides benefits over placement on the interior surface of the pressure vessel 10. The radiation dose incurred by personnel performing the replacement is reduced by not having to operate within the pressure vessel 10. Additionally, the machining steps discussed above take place outside the pressure vessel, significantly reducing or eliminating the possibility that any foreign objects are introduced to the reactor system. Furthermore, as the reactor is flooded during the refueling outage, any repair performed on the interior of the vessel would have to be performed underwater. (A cofferdam is used to prevent water from escaping the vessel during the repair disclosed herein.)

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while the environment of a PWR nuclear power plant has been discussed herein for illustrative purposes, the present invention can also be used in a variety of other environments such as a boiling water reactor nuclear power plants or other industrial plants. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A method of replacing an original nozzle in a pressure vessel, the original nozzle having an outside diameter, an inside diameter, and a wall thickness, comprising:
    removing a portion of the original nozzle extending from an exterior surface of the pressure vessel such that at least some of the original nozzle remains;
    attaching a weld pad to the exterior surface of the pressure vessel, said weld pad positioned about a hole defined in the pressure vessel;
    creating a hole through said weld pad, said weld pad hole being substantially aligned with and having a diameter substantially the same as the pressure vessel hole;
    placing a first replacement nozzle portion within said weld pad hole;
    connecting said first replacement nozzle portion to said weld pad;
    inserting a second replacement nozzle portion within said first replacement nozzle portion; and
    connecting said second replacement nozzle portion to said first replacement nozzle portion.

2. The method of claim 1, wherein:
    said removing includes creating a counterbore within the pressure vessel; and
    said placing a first replacement nozzle portion includes inserting said first replacement nozzle within said counterbore.

3. The method of claim 1, wherein said connecting said first replacement nozzle portion includes connecting said first replacement nozzle portion directly and exclusively to said weld pad.

4. The method of claim 1, wherein:
    said inserting includes inserting said second replacement nozzle portion within said first replacement nozzle portion such that end surfaces of said first and second nozzle portions are substantially coplanar; and
    said connecting a first replacement nozzle portion and said connecting a second replacement nozzle portion include positioning said end surfaces adjacent to a remaining portion of the original nozzle.

5. The method of claim 1, further comprising:
    providing a first replacement nozzle portion having a first axial length, a first outside diameter, a first inside diameter, and a first wall thickness, said first outside diameter being substantially equal to the original nozzle outside diameter; and
    providing a second replacement nozzle portion having a second axial length, a second outside diameter, a second inside diameter, and a second wall thickness, said second outside diameter being less than or equal to said first inside diameter, said second inside diameter being substantially equal to the original nozzle inside diameter, said second axial length being greater than said first axial length.

6. The method of claim 5, wherein said providing a second replacement nozzle portion includes providing said second replacement nozzle further having a third outside diameter, said third outside diameter substantially equal to said first outside diameter.

7. The method of claim 6, wherein said providing a second replacement nozzle portion includes providing said second replacement nozzle further having a first diameter axial length that is greater than said first axial length.

8. The method of claim 5, wherein said providing a first replacement nozzle portion and said providing a second replacement nozzle portion includes providing said first and second nozzle portions wherein said first wall thickness plus said second wall thickness is substantially equal to the original nozzle wall thickness.

9. The method of claim 8, wherein said providing a first replacement nozzle portion and said providing a second replacement nozzle portion further includes providing said first and second nozzle portions wherein said first wall thickness is substantially equal to said second wall thickness.

* * * * *